United States Patent
Nayyar et al.

(10) Patent No.: US 7,562,194 B2
(45) Date of Patent: Jul. 14, 2009

(54) METHOD AND APPARATUS FOR EXPLOITING PARALLELISM ACROSS MULTIPLE TRAFFIC STREAMS THROUGH A SINGLE CHANNEL

(75) Inventors: Raman Nayyar, Hillsboro, OR (US); Suvansh Krishan Kapur, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 236 days.

(21) Appl. No.: 11/348,171

(22) Filed: Feb. 6, 2006

(65) Prior Publication Data

US 2007/0186060 A1 Aug. 9, 2007

(51) Int. Cl.
*G06F 13/18* (2006.01)
(52) U.S. Cl. .................................. 711/151; 711/158
(58) Field of Classification Search .................. None
See application file for complete search history.

(56) References Cited

U.S. PATENT DOCUMENTS

| | | | | |
|---|---|---|---|---|
| 5,751,983 A | * | 5/1998 | Abramson et al. | 712/216 |
| 6,163,835 A | * | 12/2000 | Todd et al. | 712/34 |
| 6,823,405 B1 | * | 11/2004 | Askar | 710/52 |
| 7,127,573 B1 | * | 10/2006 | Strongin et al. | 711/158 |
| 7,296,008 B2 | * | 11/2007 | Passerini et al. | 707/1 |
| 2006/0047903 A1 | * | 3/2006 | Passerini | 711/114 |
| 2007/0156980 A1 | * | 7/2007 | Nayyar et al. | 711/158 |

* cited by examiner

*Primary Examiner*—Than Nguyen
(74) *Attorney, Agent, or Firm*—Blakely, Sokoloff, Taylor & Zafman LLP

(57) ABSTRACT

Methods of obtaining, enqueueing and executing several memory transactions are described, where the memory transactions may be generated in a first order but executed in a second order. Despite the relaxed ordering, essential programming paradigms such as producer-consumer relationships are not affected. Chipsets and systems using the methods are also described and claimed.

22 Claims, 3 Drawing Sheets

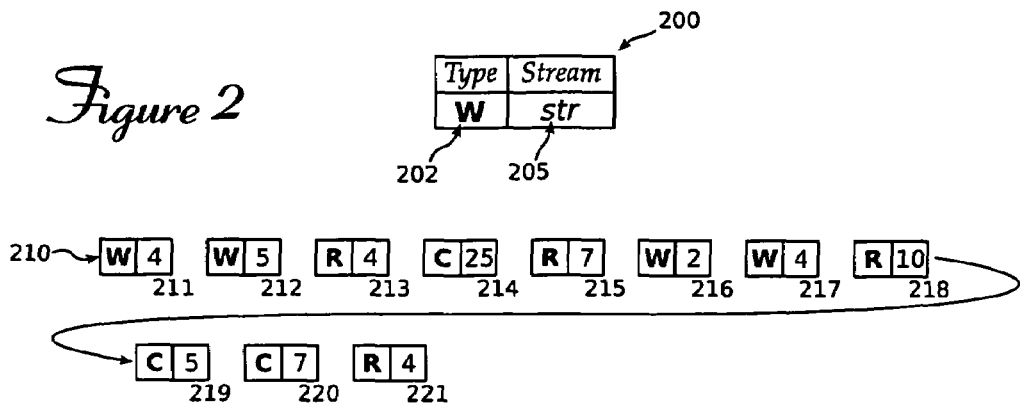
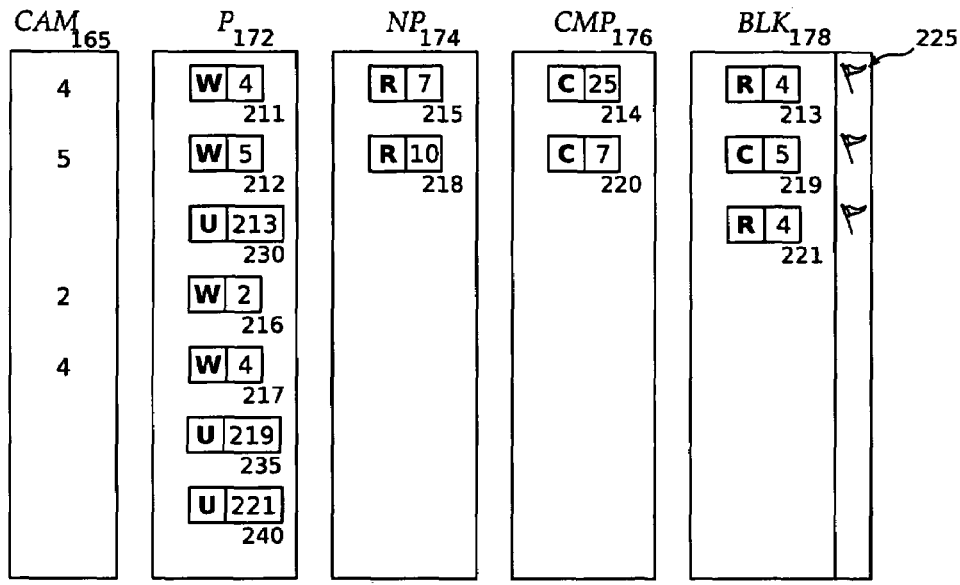
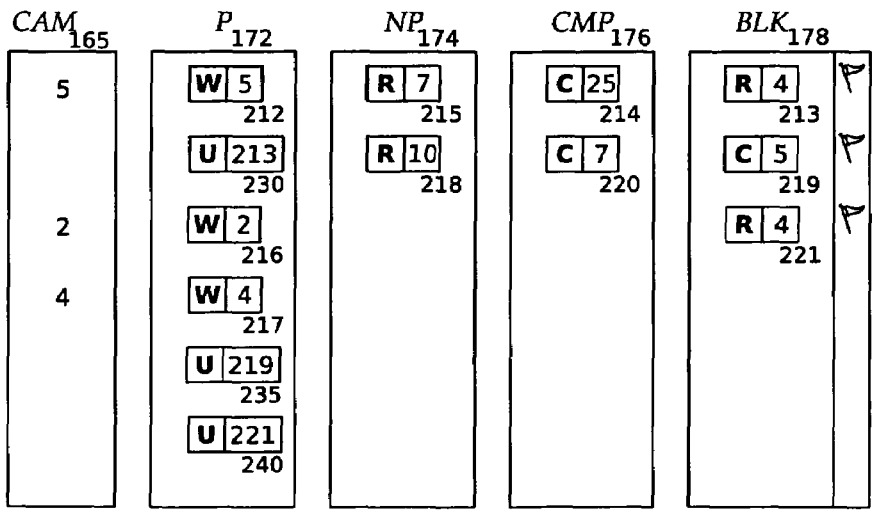

*Figure 3*
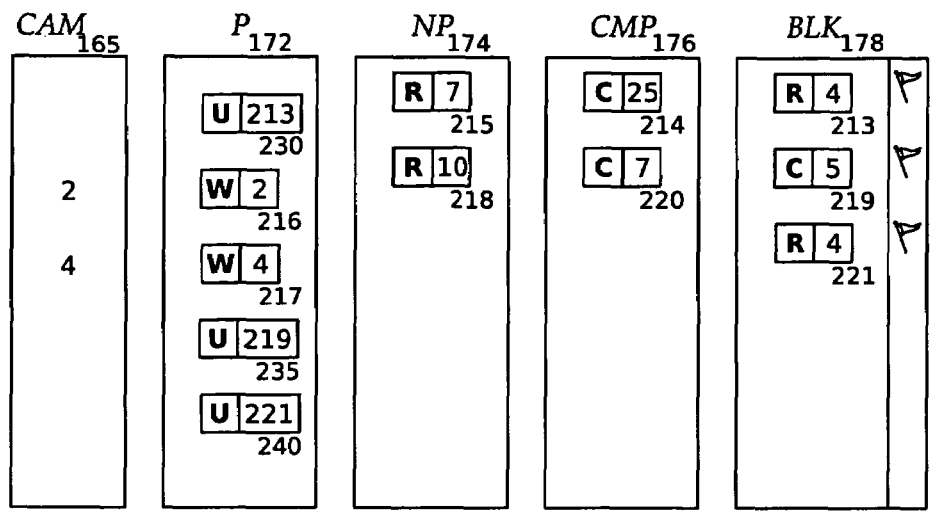
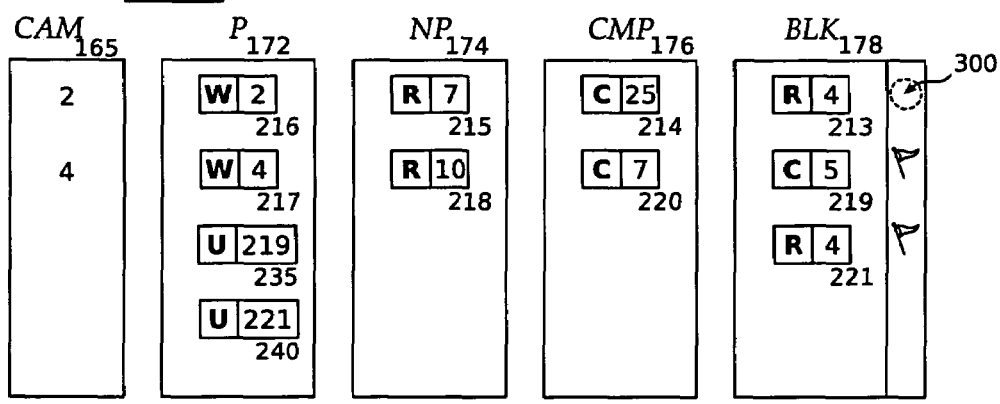

METHOD AND APPARATUS FOR EXPLOITING PARALLELISM ACROSS MULTIPLE TRAFFIC STREAMS THROUGH A SINGLE CHANNEL

FIELD OF THE INVENTION

The invention relates to memory write performance in cache-coherent architectures.

BACKGROUND

Programs executing on data processing systems often rely on peripheral devices to send, receive, or manipulate data. A program may view the peripheral's operations as atomic units (i.e. indivisible, starting at a first time and finishing some time later) but the peripheral may actually have to perform many sub-tasks to complete the work requested of it. For example, a network interface instructed to send a data packet may be required to execute a number of memory transactions to obtain all the data for the packet from memory.

In a computer system where several threads of execution are proceeding concurrently (either truly simultaneously on multiple processors or logically simultaneously by time-slicing), a constant stream of memory transactions may be generated, executed and retired by various subsystems. In general, the subsystems cannot know how the transactions are related, and therefore the system must execute transactions in the same order they were generated to avoid causing incorrect program operation.

The basic programming semantic supported by this strict ordering requirement is called the producer/consumer ("P/C") relationship. P/C relationships can appear in many complex forms, but a simple example shows how ordering changes can cause errors. Imagine two programs executing on a system. The first program produces data and the second operates on ("consumes") the data. In a canonical P/C relationship, the first program produces a quantity of data, then sets a flag to indicate to the second program that there is data for it to process. The second program monitors the flag, and when it is set, begins to consume the data. However, both "data" and "flag" may simply be values in computer memory shared between the processes—and indistinguishable to a peripheral that sets them. If the first program generates a sequence of memory transactions that result in data being placed in memory, then generates a final memory transaction to set the flag, but the system re-orders the transactions so that the flag is set before all the data is ready in memory, then the second program may begin working prematurely and consume data that has not yet been produced. Thus, re-ordering memory transactions can break P/C relationships.

Nevertheless, the ability to re-order memory transactions can provide tremendous flexibility to a computer system. For example, if a first transaction involves a resource (such as a cache location) that is temporarily unavailable, a system that can execute a second transaction that was generated after the first transaction can make forward progress, rather than stalling all execution until the resource becomes available to complete the first transaction. Identifying and exploiting circumstances in which re-ordering transactions is safe can produce overall system performance gains.

BRIEF DESCRIPTION OF DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

FIGS. 2 and 3 show a sample sequence where memory transactions are generated in a first order but executed in a second order.

DETAILED DESCRIPTION

Figure 1:
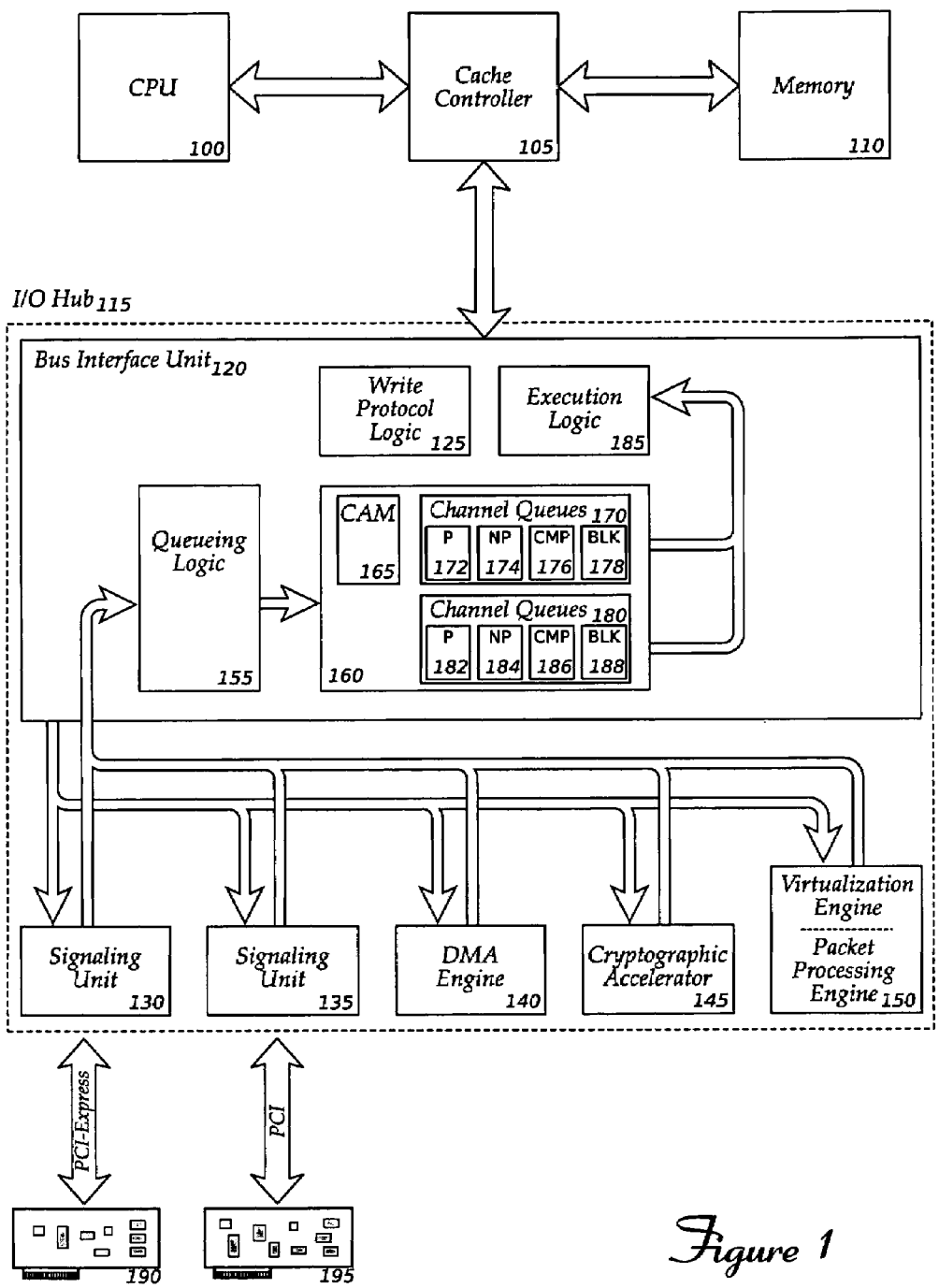
FIG. 1 is a block diagram of some parts of a system that implements an embodiment of the invention.

Memory transactions are collected and placed on one of several pending work queues based on characteristics of the transactions. Then, transactions are selected from the queues and executed. The enqueueing and selecting are designed to permit transactions to be executed out-of-order (with respect to the order in which they were generated) without risk of breaking producer/consumer relationships (and other logically-equivalent paradigms).

The ideas and operations of embodiments of the invention will be described primarily with reference to a chipset to interface between the memory of a computer system and one or more peripheral devices. ("Chipset" is a collective noun that refers to a circuit or group of circuits to perform functions of use to a computer system. Embodiments of the invention may be incorporated within a single microelectronic circuit or integrated circuit ("IC") or aggregated with other circuits into a larger system. Alternatively, functions that may be combined to implement an embodiment of the invention may be distributed among two or more separate circuits that communicate over interconnecting paths.) However, it is recognized that the queueing and re-ordering described here can also be performed by software, or by a combination of hardware and software, to obtain similar benefits.

FIG. 1 shows a portion of a data processing system, including a central processing unit ("CPU," also called a "processor,") 100, a cache controller 105 and a memory 110. One of the functions of cache controller 105 is to manage other modules' interactions with memory 110 so that the cache's contents are reliably consistent ("coherent") with memory. The storage for the cache itself may be elsewhere (for example, within CPU 100), and the cache controller may monitor modules' interactions and produce signals to invalidate certain cache entries when the underlying memory contents have changed.

The functional blocks surrounded by dashed-line 115 implement methods of embodiments of the invention by providing interface services between internal or external peripherals and system memory 110. The blocks can be thought of as an input/output ("I/O") hub to manage input and output transactions from one or more peripheral devices. Bus interface unit 120 consolidates data transactions from other modules and communicates with memory 110 by way of cache controller 105. Signaling units 130 and 135 provide signals and implement protocols for interacting with peripherals connected to I/O hub 115 through industry-standard hardware interfaces such as Peripheral Component Interconnect ("PCI"), PCI-Express, and Accelerated Graphics Port ("AGP"). The peripherals themselves may be, for example, a network interface card ("NIC") 190 or a mass storage interface card 195. Other peripherals that implement an appropriate hardware interface may also be connected to the system. For example, a graphics adapter ("video card") might be connected through an AGP interface. (AGP interface and video card not shown in this figure.)

Other peripheral devices might be implemented within I/O hub 115 itself. For example, direct memory access ("DMA")

engine 140 may be used to copy blocks of data from one area of memory 110 to another area, or to move data between memory 110 and one of the other modules in I/O hub 115. Cryptographic accelerator 145 is another representative peripheral device that might be incorporated in I/O hub 115 to manipulate (e.g. encrypt or decrypt) data traveling between another module or external device and memory 110. A common feature of signaling units 130 and 135, DMA engine 140 and cryptographic accelerator 145 that is relevant to embodiments of the invention is that all of these modules may send data to "upstream" modules such as CPU 100, cache controller 105, or memory 110.

Virtualization engine/packet processing engine ("VE/PPE") 150 is an interesting module that may be incorporated in some systems to support an operational mode called "virtual computing." A full description of virtual computing is beyond the scope of this disclosure, but briefly: hardware, firmware and software within a physical computing system can cooperate to create several "virtual" computing environments. "Guest" software executes within one of these environments as if it had a complete, independent physical system at its sole disposal, but in reality, all the resources the guest sees are emulated or shared from the underlying physical system, often under the control of low-level software known as a "hypervisor." VE/PPE 150 may contribute to the creation of virtual machines by presenting virtual instances of other modules. For example, VE/PPE 150 may use signaling unit 130 and its connected NIC 190 to create several logical NICs that can be allocated to guest software running in different virtual machines. All low-level signaling and data transfer to and from the network may occur through the physical NIC 190, but VE/PPE 150 may associate memory transactions for inbound and outbound traffic with the logical NIC to which they were directed. Similarly, VE/PPE 150 may be able to associate or tag other memory transactions for other virtual devices with a logical "stream" identifier so that transactions for one virtual machine can be distinguished from transactions for another virtual machine. Since each virtual machine and its guest software operate as independent entities, these logical stream identifiers can reliably distinguish memory transactions that cannot possibly be related. Therefore, re-ordering transactions from different streams cannot harm a producer/consumer relationship.

It is appreciated that some peripherals may be able to tag their memory transactions with a logical stream identifier, even though they are not, strictly speaking, associated with a virtual machine. For example, a network interface may tag data directed to a different protocol addresses or Media Accesss Control ("MAC") addresses with different logical streams. In this case, data are grouped together by logical stream (a "data-centric" view), rather than by virtual machine (a "hardware-centric" view).

Queueing logic 155 accepts memory transactions from the various modules and places them on one of the queues in block 160. Then, execution logic 185 selects transactions from the queues and passes them to bus interface unit 120 for execution. Embodiments of the invention are not concerned with data flow from memory to I/O hub 115; that data arrives and may be processed through different pathways. Instead, embodiments operate to identify and exploit opportunities to execute hub-to-memory transfers in a different and more-favorable order than the order in which they were generated, without risk of breaking producer/consumer and analogous logical relationships.

FIG. 1 shows two "channel queues," 170 and 180, which are groups of individual queues of memory transactions. Channel queues for channels that can distinguish logical streams will have a content-addressable memory ("CAM") 165 to help queueing logic 155 place the transactions on an appropriate queue. Channels that cannot distinguish logical streams (e.g. the channel associated with channel queues 180) do not need a CAM.

The four individual queues shown in channel queues 170 and 180 are labeled "P" (172, 182) for "Posted," "NP" (174, 184) for "Non-Posted," "CMP" (176, 186) for "Completion," and "BLK" (178, 188) for "Blocked." Different types of memory transactions are enqueued on each of the four queues within a channel (each channel operates the same, so only one channel's operation will be described). CAM 165 tracks the logical streams associated with posted transactions on "P" queues, and permits the identification of non-posted and completion transactions that must be blocked until a posted transaction from the same stream is completed.

A "Posted" transaction may be a simple "write" operation: a peripheral wishes to transfer data to an addressed location in memory, and no further interaction is expected or required. A "Non-Posted" transaction may be a "read" request: a peripheral wishes to obtain data from an addressed location in memory, and the NP transaction initiates that process. A reply (containing the data at the specified address) is expected to arrive later. A "Completion" transaction may be the response to an earlier "read" request from the processor to the peripheral: it contains data the peripheral wishes to return to the system. Finally, the "Blocked" queue contains memory transactions that cannot be executed immediately because of ordering rules. Blocked transactions will become unblocked after a corresponding Posted transaction executes, and may be executed then. Queueing logic 155 and execution logic 185 use the information in CAM 165 to ensure that memory transactions are enqueued, selected, executed, and retired according to the following ordering rules:

Posted transactions can pass any transaction except another posted transaction (nothing can pass a posted transaction)

Non-posted transactions can pass other non-posted transactions or completion transactions Completion transactions can pass other completion transactions or non-posted transactions.

"Passing" refers to issuing a transaction out of the order it was generated. For example, if transaction 1 is generated and enqueued, then transaction 2 is generated and enqueued, but transaction 2 is executed before transaction 1, then transaction 2 has passed transaction 1. Note that non-posted and completion transactions can pass each other freely, so they are equivalent for re-ordering purposes and might be consolidated into a single class (and a single queue). The embodiment described here separates them for other administrative reasons. Similarly, posted transactions might be separated into two or more classes if it is convenient to do so, where all of the classes observe the stated passing rules.

Observing the foregoing rules ensures that producer/consumer relationships are not affected by re-ordering memory transactions, and provides some flexibility in transaction issuing order that may help the system make progress when some of the queues are blocked by flow-control requests from upstream components, or when some transactions cannot be completed immediately for other reasons. However, a supplemental rule that may be applied by embodiments of the invention greatly expands the re-ordering possibilities. That rule is: transactions associated with different logical streams have no ordering restrictions between them.

The logical stream identifiers permit related memory transactions to be grouped together, and no ordering rules need be respected between transactions from different groups. Grouping transactions this way exposes parallelism between the streams which may be exploited by embodiments of the invention that execute the transactions in a different order than they were generated.

The rules presented above permit relaxed ordering of memory transaction execution in a system that generates and then retires transactions as described. However, the final rule that transactions from different logical streams may be executed in any order has much broader applicability. Any system that can identify separate logical streams can exploit that logical independence to re-order operations on data for those streams without affecting the logical correctness of software or hardware to manipulate the data stream.

FIGS. 2 and 3 show how transactions might be generated, enqueued and issued according to an embodiment of the invention. Each transaction 200 has two parts that are relevant to the operations described: a type 202 (which may be "R" for "read," "W" for "write" or "C" for "completion"); and a logical stream identifier 205. Transactions will also contain other information (such as a memory address and data to be written at the address) but that other information is not important to this discussion. The transactions (211 through 221) are generated in the order shown at 210, then enqueued as follows.

Queueing logic 155 obtains memory transaction W/4 (211) and places it on queue P 172 because its transaction type is "W." An entry in CAM 165 signals the transaction on logical stream 4. Next, W/5 (212) arrives, is enqueued on P 172, and another entry is made in CAM 165. R/4 (213) arrives, but its stream (4) yields a "hit" in CAM 165, so the transaction is placed on the blocked queue 178 and flagged (225) to indicate that it cannot be executed yet. Also, an "unblock" ("U") request 230 is added to P queue 172 so that flag 225 on R/4 (213) will be cleared. U/213 (230) is not really a memory transaction, but the queue hardware provides a convenient way to ensure that the unblock request will be executed at an acceptable time. In some embodiments, different unblocking logic may be used so that blocked transactions can be unblocked as soon as the blocking transaction executes. In the embodiment described here, note that U/213 (230) will not reach the front of P 172 until after W/5 (212) is executed. Therefore, R/4 (213) will remain blocked for slightly longer than is strictly necessary.

The remaining memory transactions 214-221 are generated and enqueued in a similar fashion: C/25 (214) finds no CAM entry, so it is enqueued on CMP 176. R/7 (215) is placed on NP 174. W/2 (216) and W/4 (217) are appended to P 172 (with corresponding CAM entries), and R/10 (218) is appended to NP 174. The next transaction to be placed on BLK 178 and flagged is C/5 (219), which hits the CAM entry corresponding to W/5 (212).

Execution logic 185 may choose and issue an entry from any of P 172, NP 174, or CMP 176, and may also choose the first entry from BLK 178 if its flag has been cleared. Upstream logic (e.g. cache controller 105) can send a flow-control message to control execution logic to stop it from issuing transactions from the P 172 or NP/CMP (174/176) queues, but transactions from other queues may still be executed.

If execution logic 185 issues W/4 (211) from P 172, the queues change as shown in the lower part of FIG. 2. Transaction W/4 (211) has been removed from the head of P 172. The execution logic could subsequently choose any of W/5 (212), R/7 (215) or C/25 (214) to issue next. Even if upstream logic pauses the issuance of posted transactions from the P queue, forward progress can be made by issuing a request from the NP, CMP, or BLK queues, although those requests would be out-of-order with respect to W/5 (212). Since they belong to different logical streams, no P/C error can result.

Continuing in FIG. 3, if execution logic 185 issues W/5 (212), then U/213 (230) will reach the head of P 172. This unblock request may be performed immediately: as shown in the lower portion of FIG. 3, the "blocked" flag on R/4 (213) has been cleared (see element 300). Now, execution logic may choose any of W/2 (216), R/7 (215), C/25 (214) or R/4 (213).

The queueing and execution logic described above may be useful in a system where a cache controller imposes requirements on subsystems that wish to write data to memory. In such a system, a would-be writer must transmit a protocol request, identifying the address it wishes to write, before performing the write. The cache controller will arrange cache operations so that the would-be writer "owns" the corresponding cache line, then respond to the protocol request with a protocol response authorizing the writer to go ahead. Once the writer receives this response, it can transmit the data to be stored in memory. (Write protocol logic identified as 125 in FIG. 1 may implement the would-be writer's side of this protocol.) Since write requests may span several cache lines, a writer may have to issue several protocol requests and wait for several protocol responses before writing the data. However, the cache controller may transmit responses out-of-order with respect to the order of the protocol requests. If this occurs, the writer may generate memory transactions in an unusual order. If the transactions could not be re-ordered or interleaved with transactions from other logical streams, system progress might be impaired. Embodiments of the invention may relax memory ordering requirements and improve overall performance.

In some systems, the component described above as cache controller 105 may be part of a larger subsystem called a memory controller hub ("MCH") that manages data flow among processor(s), I/Q hubs, and memory. Memory transactions may be generated, enqueued and executed by modules within the MCH, and some of those modules may be able to distinguish logical streams within those memory transactions. In such an MCH, embodiments of the invention can be used to exploit parallelism that appears at that point.

An embodiment of the invention may be a machine-readable medium having stored thereon instructions which cause a processor to perform operations as described above. In other embodiments, the operations might be performed by specific hardware components that contain hardwired logic. Those operations might alternatively be performed by any combination of programmed computer components and custom hardware components.

A machine-readable medium may include any mechanism for storing or transmitting information in a form readable by a machine (e.g., a computer), including but not limited to Compact Disc Read-Only Memory (CD-ROMs), Read-Only Memory (ROMs), Random Access Memory (RAM), Erasable Programmable Read-Only Memory (EPROM), and a transmission over the Internet.

The applications of the present invention have been described largely by reference to specific examples and in terms of particular allocations of functionality to certain hardware and/or software components. However, those of skill in the art will recognize that memory transactions can be re-ordered to permit more efficient processing by software and hardware that distribute the functions of embodiments of this invention differently than herein described. Such variations and implementations are understood to be apprehended according to the following claims.

We claim:

1. A method comprising:
    obtaining a plurality of memory transactions in a first order, each transaction to be associated with a logical identifier;
    enqueuing each memory transaction on one of a plurality of work queues, the work queue to be selected based on a type of the memory transaction and the logical identifier of the memory transaction, wherein the plurality of work queues includes a queue to hold blocked transactions; and
    executing the plurality of memory transactions in a second order.

2. The method of claim 1, wherein the second order is different from the first order.

3. The method of claim 1, wherein a logical identifier comprises an identifier of a virtual machine that issued the transaction.

4. The method of claim 1, wherein a logical identifier comprises an identifier of a data stream to which the transaction pertains.

5. The method of claim 1, wherein the type of a memory transaction is one of a first type or a second type; and
    wherein a ruleset permits:
        a transaction of the first type to pass a transaction of the second type;
        a transaction of the second type to pass another transaction of the second type; and
        a transaction of either type to pass another transaction of either type if the transactions are associated with different logical identifiers.

6. The method of claim 1 wherein the plurality of work queues includes a queue to hold transactions of a first type and a queue to hold transactions of a second type.

7. The method of claim 1, further comprising:
    unblocking a blocked memory transaction after executing a blocking memory transaction.

8. The method of claim 1, further comprising:
    selecting a next transaction to execute from a head of one of the plurality of queues, wherein a transaction at the head of a first queue may be executed at any time, and a transaction at the head of a second queue may be blocked pending an execution of a blocking transaction.

9. The method of claim 1, wherein executing a memory transaction comprises one of:
    transmitting data from a hardware peripheral to a memory through a cache controller; or
    transmitting a request for data from the memory through the cache controller.

10. A chipset comprising:
    a plurality of targets to generate memory transactions;
    a virtualization engine to associate a logical stream with a memory transaction;
    a bus interface unit to issue memory transactions to a cache controller;
    queueing logic to preserve an ordering relationship between a plurality of generated memory transactions and a plurality of issued memory transactions; and
    unblocking logic to unblock a blocked memory transaction.

11. The chipset of claim 10, further comprising:
    a content-addressable memory ("CAM") to indicate whether a pending memory transaction references a logical stream identical to a logical stream of a newly-generated memory transaction.

12. The chipset of claim 10, further comprising:
    a plurality of queues to hold memory transactions pending execution, wherein a first queue holds transactions of a first type, a second queue holds transactions of a second type, and a third queue holds transactions that are blocked by an earlier-received transaction on the first queue.

13. The chipset of claim 10, further comprising:
    a signaling unit to communicate with a peripheral device according to an interface protocol, wherein
    the signaling unit generates memory transactions; and
    the virtualization engine produces instances of a plurality of logical devices to emulate the peripheral device.

14. The chipset of claim 13, wherein the interface protocol comprises one of Peripheral Component Interconnect ("PCI"), PCI-Express, or Accelerated Graphics Port ("AGP").

15. The chipset of claim 13, wherein the peripheral device comprises one of a network interface card ("NIC"), a mass-storage device interface, a graphics adapter, or a cryptographic accelerator.

16. The chipset of claim 10, further comprising:
    write protocol management logic to execute a write protocol before issuing a memory transaction.

17. The chipset of claim 16, wherein the write protocol comprises:
    transmitting a request to obtain ownership of a cache line; and
    receiving a response granting ownership of the cache line.

18. The chipset of claim 17, wherein a plurality of protocol requests transmitted in a first order elicits a plurality of protocol responses received in a second order.

19. A system comprising:
    a memory;
    a cache controller to maintain data coherency between the memory and a cache;
    a plurality of peripheral devices; and
    a hub to exchange data between the memory and the plurality of peripheral devices, the hub comprising:
        a signaling unit to communicate with a peripheral device;
        a virtualization engine to produce instances of a plurality of virtual devices to emulate the peripheral device; and
        queueing logic to hold a plurality of memory transactions pending execution; and
        execution logic to select a next memory transaction to execute;
    wherein a plurality of memory transactions from a peripheral device are generated in a first order;
    the plurality of memory transactions are executed in a second order;
    the virtualization engine is to associate a virtual device with a memory transaction of the peripheral device; and
    the ordering logic is to maintain an order in which memory transactions associated with one virtual device are executed.

20. A computer-readable medium containing instructions to cause a processor to perform operations comprising:
    receiving a plurality of memory requests in a first order;
    sorting the memory requests according to a type and a group of the request;
    queueing the sorted memory requests on a plurality of queues for later execution, wherein the plurality of queues comprises a first queue to hold requests of a first type, a queue to hold blocked requests and a request is blocked if another request of an identical group is on the first queue; and executing a memory request from one of the plurality of queues.

21. The computer-readable medium of claim 20, wherein a first-received of the plurality of memory requests is different from a first-executed of the plurality of memory requests.

22. The computer-readable medium of claim 20, wherein the plurality of queues further comprises:
a second queue to hold requests of a second type.

* * * * *